Figure 1:
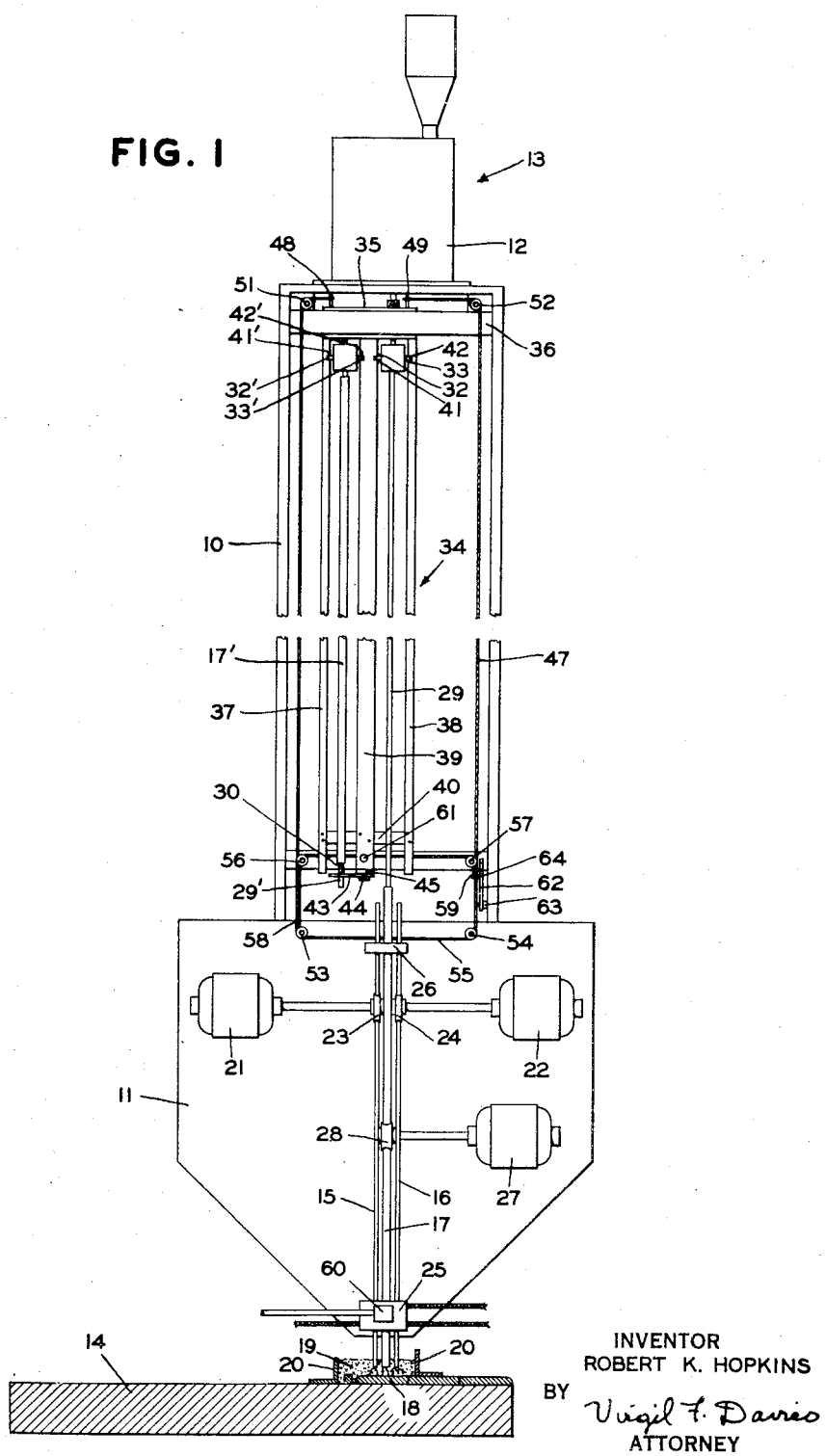

Sept. 26, 1939.   R. K. HOPKINS   2,174,175
DISPENSING DEVICE
Original Filed Nov. 5, 1936   3 Sheets-Sheet 1

INVENTOR
ROBERT K. HOPKINS
BY Virgil F. Davies
ATTORNEY

Sept. 26, 1939.  R. K. HOPKINS  2,174,175
DISPENSING DEVICE
Original Filed Nov. 5, 1936  3 Sheets-Sheet 2

INVENTOR
ROBERT K. HOPKINS
BY Virgil F. Davis
ATTORNEY

Sept. 26, 1939.     R. K. HOPKINS     2,174,175
DISPENSING DEVICE
Original Filed Nov. 5, 1936    3 Sheets-Sheet 3

INVENTOR
ROBERT K. HOPKINS
BY Virgil F. Davico
ATTORNEY

Patented Sept. 26, 1939

2,174,175

UNITED STATES PATENT OFFICE 2,174,175

DISPENSING DEVICE

Robert K. Hopkins, New York, N. Y., assignor to M. W. Kellogg Co., New York, N. Y., a corporation of Delaware Original application November 5, 1936, Serial No. 109,292. Divided and this application April 16, 1938, Serial No. 202,461

4 Claims. (Cl. 221—108)

This invention relates, in general, to the electric fusion of metals, and has particular reference to an improved apparatus for carrying out operations of this type.

This application is a division of my copending application Serial No. 109,292, filed November 5, 1936.

In the present practice of electric welding the deposition of metal is ordinarily carried out by the use of consumable electrodes. These electrodes may be bare or covered but in any case, the metallic component thereof includes all or substantially all of the constituents required to produce the desired deposited metal. Thus, electrode metal is generally of special analysis and by reason of this fact and the fact that it is usually produced in small quantities is considerably more expensive than metal of generally similar analysis in the usual commercial forms. In any event, electrode metal is usually much more expensive than the constituents thereof in their readily available commercial forms.

In my copending application, Serial No. 101,103 filed September 16, 1936, I have disclosed and claimed a method, and apparatus for carrying it out in practice, in which the constituents of the desired deposited metal in the readily available commercial forms are supplied to the welding gap in separately controlled streams so that with any set of constituents weld metals of wide variation in analysis may easily be deposited. Preferably, some of the constituents are supplied in the form of a hollow metallic electrode and the remainder are supplied in the form of powder, granules, pellets or wire and fed to the welding gap through the hollow electrode. Thus, for instance, when it is desired to deposit an iron-chrome alloy upon carbon steel base metal the hollow electrode is made of mild steel and the chromium is supplied as ferro-chrome. With this set of constituents, a wide range of iron-chrome alloys may be deposited.

The apparatus of this invention is in the nature of an improvement over the apparatus of my copending application, above identified.

It is the primary object of this invention to provide an apparatus of the character mentioned that includes an improved arrangement for feeding and for controlling the rate of feed of the stream of material passed to the welding gap through the hollow electrode.

The further objects and advantages of this invention will be apparent from the following description and claims taken in connection with the accompanying drawings forming a part of this application, in which, Fig. 1 is a front elevation showing the welding machine depositing a welded veneer upon a workpiece.

Figure 2:
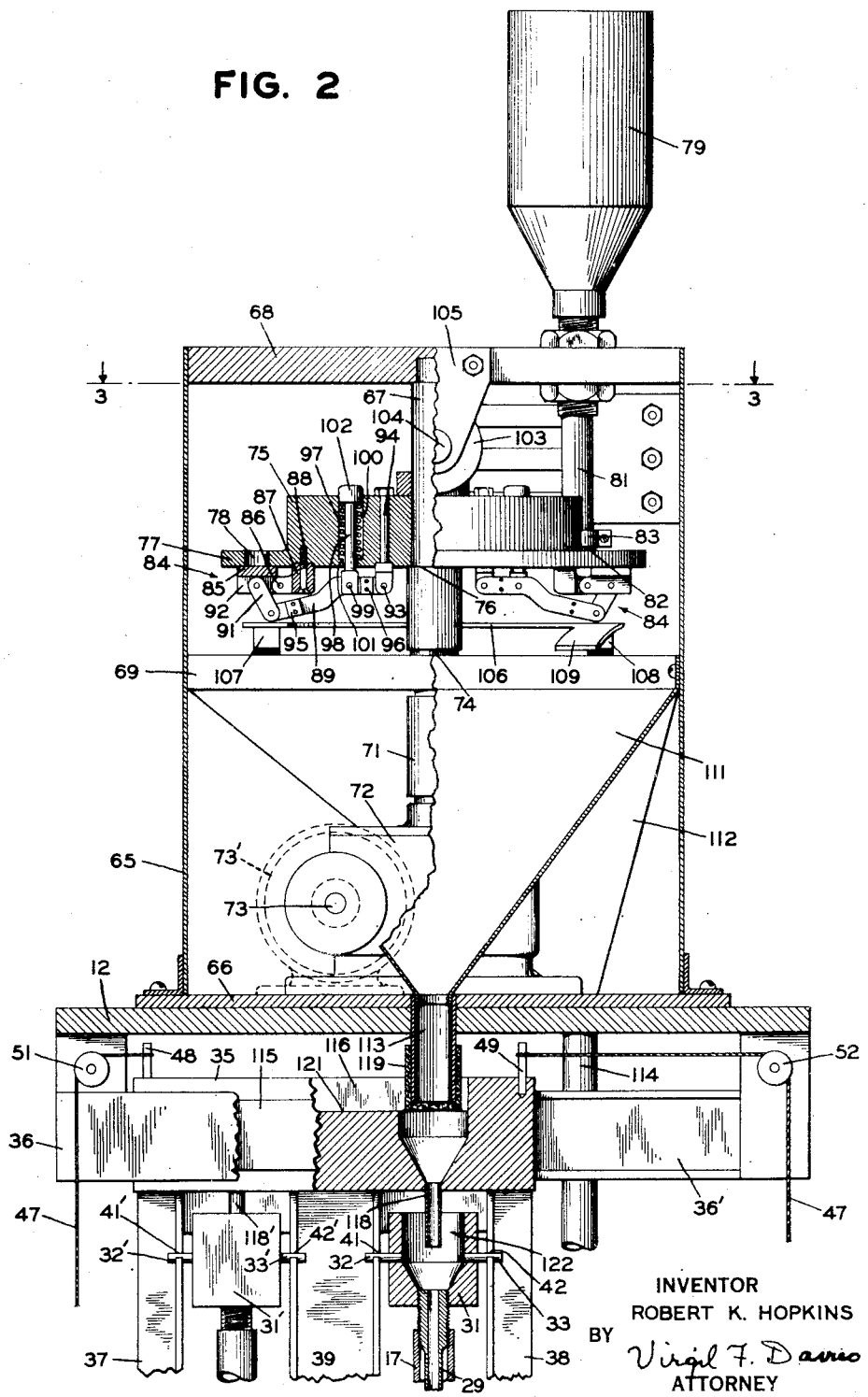
Figure 3:
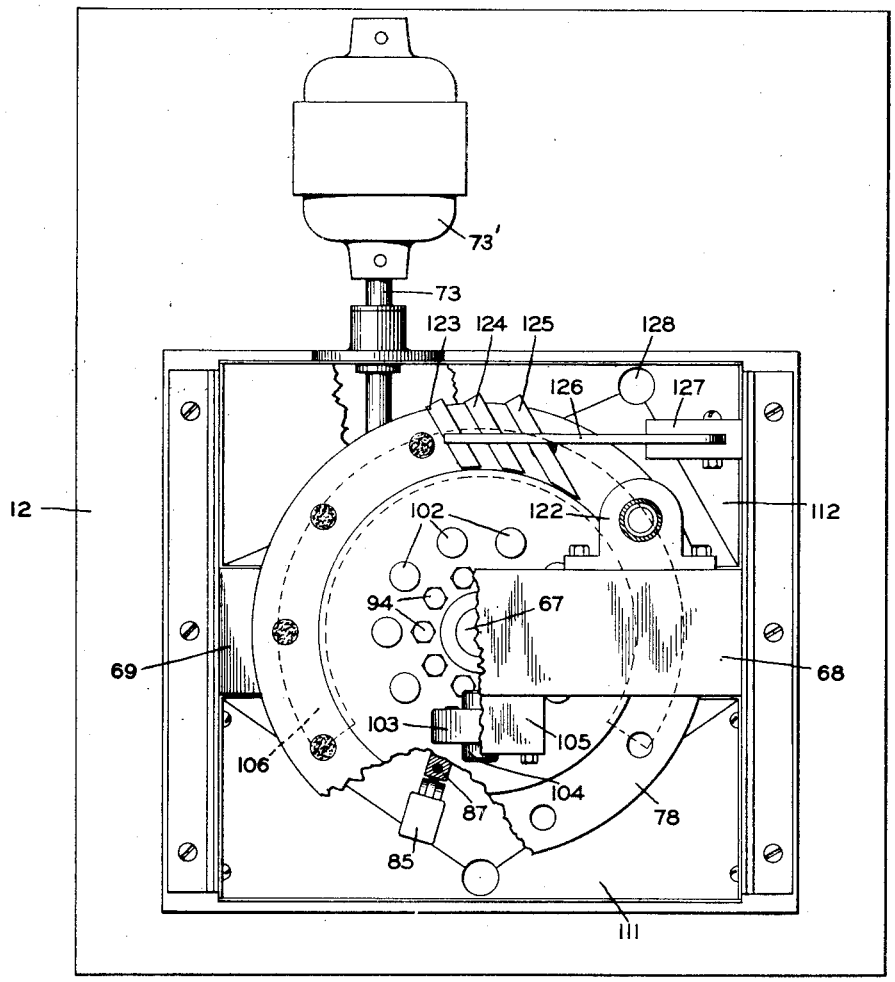

Fig. 2 is an elevation view showing the feed mechanism for one of the weld metal constituents; and Fig. 3 is a sectional view taken along lines 3—3 of Fig. 2.

Referring to Fig. 1, the welding machine comprises a supporting frame 10, to the lower end of which is attached a welding head 11. Welding head 11 may be of any preferred construction and arrangement but should include all of the usual elements and devices necessary for successful operation, these elements and devices, for the purposes of this application being considered as located in back of the panel of welding head 11. The upper portion of frame 10 supports a platform 12 upon which is positioned an automatic feeding mechanism 13, to be fully described hereinafter. The welding machine is positioned above workpiece 14 and may be arranged for movement relative to workpiece 14. On the other hand, the welding machine may be fixedly positioned and workpiece 14 supported to allow it to be moved relative to the welding machine, or both the welding machine and the workpiece 14 may be supported for desired movement. It is to be understood, that all structural requirements necessary to maintain the various elements in their proper relationship have been provided, despite their omission from the drawings for the sake of convenience and clarity.

The apparatus disclosed, includes three electrodes 15, 16 and 17 which together with the material passed through hollow electrode 17 supply all of the constituents for the required deposited metal. The spacing of the electrodes is such that they deposit their metal in a common pool 18. The pool 18 is formed into a continuous band by the relative movement of the workpiece 14 and the welding machine.

As particularly shown in Fig. 1 the ends of electrodes 15, 16 and 17 are submerged in a flux blanket 19 that is formed between members 20 disposed along the electrode path. The purpose and composition of flux blanket 19 as well as the band forming operations are disclosed at length in my copending application above identified, and need not be repeated here.

It is to be understood that while a veneering operation has been illustrated, the apparatus of this invention is not limited thereto and can be used equally well in connection with any of the known welding operations.

The composition of electrodes 15, 16 and 17, as well as the composition of the material passed through hollow electrode 17, which in the rest of this application will be referred to as the granular material, will depend on the composition of the weld metal it is desired to deposit as well as the composition of the base metal upon which the weld metal is deposited. For instance, if the weld metal is to be an iron-chrome alloy and the base metal a carbon steel, all three electrodes may be of iron, or some may be of iron and others of some cheap readily available iron-chrome alloy. When the weld metal desired is a chrome-iron alloy the granular material may be ferro-chrome. When the weld metal desired includes more than one alloying constituent as for instance, when it is a chrome-nickel-iron alloy, the granular material may be a proper mixture of ferro-chrome and metallic nickel or some suitable compound of nickel. In this case, however, the nickel may also be supplied by making one or more of the electrodes of nickel. Electrodes 15 and 16 may be in any preferred form, such as rod or wire. For the purposes of this application they will be considered to be wire and supplied as from a pair of reels mounted on the supporting structure in any preferred manner. Electrode 17 is preferably hollow or at least trough-like. When depositing iron alloys in which iron is a major constituent upon an iron or carbon steel base metal electrode 17 is preferably an iron or a mild steel pipe since both of these articles are cheap and readily available.

Electrodes 15 and 16 are positively fed toward workpiece 14 by means of grooved feed wheels mounted on the shafts of the electrode feed motors 21 and 22.

Pressure rollers 23 and 24 serve to hold the electrodes 15 and 16 against their corresponding feed wheels in order to maintain a firm gripping action on the electrodes at all times. Correct lateral positioning of the three electrodes is maintained by means of the contact nozzle 25 and the guide block 26 through which the electrodes pass.

Contact nozzle 25 not only maintains the proper spacing between the electrodes, but also supplies current to them from the current source. The nozzle is provided with suitable insulating arrangements so that each electrode may be supplied with current independently of the others. With this arrangement it is possible to control and vary as necessary, the current being supplied to each electrode. When desirable, it is also possible to cut off the current supply to any of the electrodes in order that they may be fed to the welding pool as dead electrodes. It is, of course, apparent that the current may also be supplied from a single source through the contact nozzle to any combination of the electrodes by eliminating the insulating means.

Electrode 17 comprises a plurality of easily connectible lengths, two lengths being shown in the drawings although an indefinite number may be used. The separate hollow electrode lengths are adapted to be joined end-to-end by any suitable means, such as the threaded nipple 30.

The hollow electrode 17 is positively fed to the welding gap by means of a driving roller, connected to the shaft of the motor 27, that is backed up by a pressure roller 28 diametrically opposed thereto. Correct proportioning of the electrode constituents is maintained by regulating the speed of the feeding motors so that a suitable relationship between the rate of feed of the electrodes and the rate of travel of the welding machine relative to the workpiece may be obtained in order to secure weld metal of the desired analysis. The manner of the obtaining and controlling these and the other essential factors is set out at length in my copending application above identified. The granular material is fed through the hollow electrode 17, the rate of feed being controlled by means of the automatic feeding mechanism 13. The feeding connection between the mechanism 13 and the hollow electrode 17 is maintained by providing a telescopic arrangement between the hollow electrode 17 and a feed pipe 29, the outside diameter of which at least at its bottom end is substantially less than the bore of the hollow electrode, and also less than the bore of the nipple 18. The upper end of the pipe 29 is fitted into a feed pipe head 31 having a funnel-shaped interior connecting with the hollow center of the feed pipe to form a pathway for the granular material from the feeding mechanism 13 to the hollow electrode. Projecting outwardly on opposite sides of this pipe head 31 are a pair of pins 32 and 33 which support the pipe 29 in a manner to be presently described. As the hollow electrode is consumed in the welding operation it is withdrawn from the feeding pipe 29 until the two become separated, at which time a new hollow electrode length is joined to the remaining portion of the hollow electrode which is being consumed. To expedite this operation, a second hollow electrode length 17' is constantly kept in readiness so that a rapid change-over may be made, and the new length 17' secured to the upper end of the preceding length 17 without interrupting or materially affecting the continuity of the feeding.

For this purpose, a pipe rack, generally indicated at 34, is provided. It comprises a movable block 35 adapted to slide transversely in a guideway 36 secured to the upper portion of the framework 10 directly beneath the platform 12. Secured to the under side of the block 35, and projecting downwardly therefrom in parallel fashion, are a pair of angle iron strips 37 and 38 and, spaced midway therebetween, a strip of U-shaped channel iron 39. A transverse strip 40 is fastened across their lower ends to provide a sturdy framework and to maintain the proper lateral spacing.

The forwardly projecting sides of the channel and angle iron strips are provided with a series of slots 41, 42, 41' at their upper ends which act as bearing grooves for the pins 32, 33, 32' and 33' of the feed pipe head 31 and 31'. The slots are cut at a slight downward angle so that a slight upward thrust of the feed pipes will cause the same to be forced outwardly to disengage the feed pipe head from the rack.

The idle feed pipe 29' is kept in readiness with a length of hollow electrode 17' thereon, so that a rapid changeover may be made. The pipe 17' is held on the feed pipe 29' in either of two ways, by screwing the upper end of the electrode a few turns onto the threaded portion of the feed pipe, projecting from beneath the head 31', which portion has the same thread-size as the nipple 30 or by means of a horizontal lever 43 pivoted at 44 to a plate 45 fitted into the U-channel member 39 at its lower end. The lever 43 is provided, near its free end, with a pair of slots oppositely disposed and of a width greater than the diameter of the feed pipes, but less than the diameter of the projecting end of the nipple 30. The pivot 44 is spaced midway between the hanging feed pipes 29 and 29' and the slots are spaced from the pivot sufficiently so that by swinging the lever either to the left or right the forward slot may be made to engage its corresponding feed pipe to provide a lateral support for the pipe electrode. The lower support 43 may be used whenever short lengths of hollow electrodes are being used, in which case the electrode, if suspended by its upper threaded portion, might not be within reach of the operator.

The electrode switching operation is accomplished as follows: a length of cable 47 is secured at its ends to a pair of pin members 48 and 49 projecting from the upper surface of the sliding block 35. The cable passes around pulleys 51 and 52 secured to the upper portion of the frame work 10, and around pulleys 53 and 54 secured to the welding head 11. A second length of cable 55 passes around a pair of pulleys 56 and 57 and has its ends fastened to cable 47 at points 58 and 59. At its midpoint, the cable 55 is suitably secured to a pin 61 projecting from the back of the U-channel member 39. A shift lever 62, having one end pivotally mounted at 63 to the framework 10 and the other end projecting forwardly to a point within easy reach of the operator, is secured at a point 64 between its ends to the cable 47. Within the rack 34 in the position shown in Fig. 1 the lever 62 will be in its raised position.

When the hollow electrode 17 has been consumed sufficiently to cause it to separate from the feed pipe 29, the reserve length of hollow electrode 17' is brought into position for use by pressing down the free end of shift lever 62. From the cable and pulley arrangement shown in the drawings, it is obvious that, as the lever is pushed down, the rack will move to the right. Suitable limiting arrangements may be made so that the rack will move only to a position in which the electrode lengths 17 and 17' are in alinement, or the positioning may be done by hand. The two electrode lengths are then joined by unscrewing the electrode 17' from the upper threaded portion of the feed pipe 29' or where a short length is being added, by releasing the plate member 43 and screwing the nipple 30 at the lower end into the threaded end of the electrode 17. This connection may be made very rapidly without interrupting the continuity of the feeding, it being necessary only to perform the operation before the electrode 17 passes through the guide block 26. During the changeover the flow of the granular material is momentarily interrupted, as will be later described in connection with the feeding mechanism shown in Fig. 2. A new length of hollow electrode 17 may then be placed in readiness for use by removing the feed pipe 29 from the rack, which may be done by merely thrusting the same upwardly to release the pivot pins 32 and 33 from their supports and placing a new electrode length thereon, or by tilting the feed pipe outwardly at its lower end and thrusting a length of hollow electrode on the latter. The plate 43 is then swung about its pivot 44 to a position where the opposite slot in the free end will engage the feed pipe 29 and act as a support for the new electrode length.

In order to maintain a substantially continuous flow of the granular material through the electrode, and to prevent the material from clogging in the electrode, a vibrator 60 is positioned on contact nozzle 25. The vibrator may be of any well-known type, its function being to impart a continuous tapping action to the hollow electrode to shake loose any particles of material that may adhere to the inner surface of the electrode and clog the flow of granular material therethrough. The vibrator illustrated is of a compressed air type, although any mechanical or electrical type might be used in its stead.

Referring now to Fig. 2 the feed mechanism 13 will be described. It comprises a housing 65 mounted on a base plate 66 which rests upon the platform 12. Centrally located within the housing is a vertical shaft 67 supported by cross-member bearing plates 68 and 69 secured to the sides of the housing. The upper end of the shaft is set in a recess in the bearing plate 68 and the lower end projects through an opening in plate 69 where it is joined, by means of a coupling sleeve 71, to the shaft of a gear reduction box 72. The driving shaft 73 of the gear reduction box is connected to a motor 73 shown in dotted lines and located at the rear of the housing on the platform 12. The motor includes suitable speed varying means so that the driving rate may be varied at will. The speed varying means may take the form of a variable speed motor or, in lieu thereof, any of the well known arrangements of variable speed transmission. Longitudinal movement of the shaft 67 downwardly is prevented by means of a stepped portion 74 which rests upon the bearing plate 69. Mounted on the shaft 67 intermediate the cross-members 68 and 69 is a flanged disc 75. The shaft is formed of greater diameter below the disc in order to provide a shoulder 76 upon which the disc may rest. A suitable arrangement, such as a pin or keyway, is provided so that the disc will rotate integral with the shaft 67. The flanged portion 77 of the disc 75 is provided with a series of holes 78 equi-spaced about the disc, ten holes are used in the present embodiment. These holes serve as carrying receptacles for the granular material which is supplied from the storage container 79, mounted on a bracket projecting from the bearing plate 68, and having a funnel-shaped bottom. A pipe 81 directs the granular material from the container to the surface of the disc flange 77 and into the holes 78 as they pass directly beneath the lower opening of the pipe. A felt wiper sleeve 82 connected to the lower end of pipe 81 by a clamp 38 contacts the flange surface. As the disc rotates the sleeve holds back the excess particles and permits a level receptacle full of granular particles to be conveyed.

While rotating from the point of filling to the point where discharge is to take place, the metal granules are retained in the holes 78 by means of individual dump-valves 84 disposed adjacent each hole on the under side of the disc. The valve mechanism comprises a trap door 85 pivoted at 86 to a block 87 secured to the underside of the disc by a screw 88. A lever 89, disposed on a radial line, has its outer end connected, through a link 91, to a projecting portion 92 of the trap door 85, and its inner end pivotally secured at 93 to the projecting head of a bolt 94 extending through the disc. The lever 89 comprises two identical parallel members held apart by spacing blocks 95 and 96. The trap door 85 is normally held in its closed position by means of a spring 97 acting upon an operating plunger 98 extending through the disc. The lower end of the plunger is pivotally secured at 99 to the lever 89 at a point intermediate its ends. The spring 97 is disposed in a recess 100 having a ledge portion 101 at its lower end. The spring is held under compression between the ledge portion 101 and the mushroom head 102 of the operating plunger 98.

As the shaft 57 rotates, the head 102, which normally projects a substantial distance above the upper surface of the disc, engages a roller 103, pivoted at 104 to a bracket 105 mounted on the cross member 68. When the disc reaches a position where a hole 78 is directly forward, the plunger head 102 will be urged downwardly by the roller 103. This causes the trap door 85 to open, thus releasing the granular material. As the plunger head passes from beneath the roller the trap door 85 closes under the action of the spring 97. It is obvious that as the disc rotates there will be an intermittent discharge of granular material, the rate of which is determined and controlled by the speed varying means of the operating motor.

To prevent small particles of the granular material from adhering to the surface of the trap door or under side of the disc, and thus preventing the trap door from closing to form a good seal, a wiping brush may be placed in convenient position on the front of the framework to wipe the particles off door and disc immediately following the dumping operation and before the trap door has had an opportunity to close. An additional safeguard to insure closing of the trap door sufficiently to prevent leakage has been provided in the form of a contact ring 106 supported on the cross member 69 by two non-conductive supports 107 and 108 and connected to a source of potential. The ring 106 is cut away for a substantial portion of its circumference, as shown in Fig. 3, to permit the lever 89 to be lowered when at its discharge position. After discharge takes place, the lever 89 ordinarily is pulled upwardly. However, should the mechanism become jammed, or for any reason fail to function properly and the trap door remains open, the forward end of the lever will touch the contact ring. By grounding the disc and inserting a warning device in circuit the operator may be apprised of the improper operation of the valve. The approach end of the ring 106 is curved downwardly at 109 to prevent the lever from catching on the edge of the ring when it becomes stuck in its lowermost position. The inclined portion of the ring also serves to start the closing operation of the lever when the latter is below the plane of the ring. Since the ring is positioned so that it barely misses the valve mechanism in its closed position, the ring itself will in many cases, release the stuck valve.

Below the bearing plate 69 are two funnel shaped guides 111 and 112 for catching the granular material. The guide 111 is placed forward of the bearing plate and is secured thereto at its upper end. The lower end terminates in a circular opening fitted to a pipe 113 extending through the support 12. This funnel is for directing the granules to the hollow electrode. The second funnel member is disposed to the rear of bearing plate 69 and terminates at a pipe 114 at the rear of the apparatus. This funnel is for catching the excess particles that are wiped off the disc in the leveling operation. These particles may be caught in a receptacle placed beneath the pipe 114 and replaced in the storage container 79.

The sliding block 35 has a projecting portion 115 on either side adapted to engage and slide along the U-shaped channel guides 36 and 36'. The block 35 has a longitudinal groove 116 cut in its upper surface and at each end of the groove there is a funnel shaped hole 117 projecting vertically through the block. Outlet pipes 118 and 118' are fitted into the lower side of the block at the bottom of the holes. It will be observed that the outlet pipe 118 projects into the opening in the feed pipe head 31. As shown in the drawings the rack is in position for direct feeding into pipe electrode 17.

As the rack is shifted to its opposite position by means of the cable 47, the pipe 113 passes along the groove 116. A felt sleeve 119 is fitted on the lower end of the pipe 113 and projects below its end so as to engage the surface 121 at the bottom of the groove. The felt sleeve serves as a wiper to prevent particles from spilling over the surface of the groove and also to seal the material in the pipe 113 during the changeover operation. During the changeover it is not necessary to stop the feeding apparatus since the particles may be allowed to accumulate inside the pipe 113. Upon reaching the opening on the opposite side of the groove the entire accumulation will dump.

The construction of the feed pipe head is also clearly shown in this figure. The block 31 has a cylindrical opening 122 tapering at its lower end. The upper threaded end of the feed pipe 29 is screwed into a threaded opening in the lower end of the block 31. The method of supporting the block by means of the pins 32 and 33 in grooves 41 and 42 formed in the sides of the angle iron and channel iron frames is also clearly shown.

Fig. 3 shows a plan view of the feeding apparatus with the storage container removed and portions broken away for the sake of clarity.

The positioning of the storage container bracket 46 122 and the valve operating roller bracket 105 on the cross member 68 is clearly shown. To insure accurate leveling of the particles of granular material in the holes 78 and to keep the upper surface of the flange portion 77 of the disc free from loose particles, an additional safeguard in the form of three wiper brushes is provided. The brushes 123, 124, and 125 are mounted on arms 126 extending from a bracket 127 fastened to the side of the housing. These wipers may be made of felt or other suitable material and are disposed to bear lightly on the surface of the disc. The wipers are set at an angle so that the particles will be brushed off the outer edge of the flange as the disc rotates. The particles brushed off are caught in the funnel-shaped guide 112 and directed through the outlet 128 to the outlet pipe 114, shown in Fig. 2.

While this invention has been shown in but one form, it will be obvious to those skilled in the art that it is not so limited but is susceptible to various changes and modifications without departing from the spirit thereof, and it is desired therefore that only such limitations shall be placed thereon as are imposed by the prior art or are specifically set forth in the appended claims.

I claim:

1. A metering device for feeding metal in arc welding apparatus, a source of material, a rotatable disc having a plurality of holes therethrough, individual spring operated closure means adapted to close the bottoms of said holes to form a plurality of material receptacles, said receptacles being arranged to travel in a circular path between said source and a point of discharge, the feeding rate of material from said source exceeding the conveying rate along said path, means for trimming off deposited material in excess of the volume capacity of said receptacles, means for successively opening said closure means at said discharge point to release said material, and a signalling device adapted to operate when said closure means opens at any position along said path other than said discharge point.

2. A metering device for feeding metal in arc welding apparatus, a source of material, a rotatable disc having a plurality of holes therethrough, individual spring operated closure means cooperating with said holes to form a plurality of material receptacles, said receptacles being arranged to travel in a circular path between said source of material and a point of discharge, the feeding rate of material from said source substantially exceeding the conveying rate of material along said path, means for trimming off deposited material in excess of the volume capacity of said receptacles, means for successively opening said closure means at said discharge point to release said material, and a signalling device comprising an insulated contact segment disposed adjacent said closure means and arranged to be contacted by said closure means when the latter open at any point other than said discharge point.

3. A metering device for feeding metal in arc welding apparatus comprising, material supply means, a disc supported for rotation about a substantially vertical axis, said disc provided with holes adjacent its periphery into which material from said supply means is adapted to discharge, a swingable closure for the bottom of each of said holes, operable means connected to each of said closures for swinging said closures into and out of closing relation with their respective holes, and actuating means for said operable means, said actuating means including a member for each of said closures adapted to extend through said disc and a spring constantly urging said members through said disc whereby said closures are normally held in closing relation with their respective holes, said members being spaced on a circle concentric with said axis, and a fixedly positioned roller adapted to ride on said disc during the rotation thereof and to depress said members as they pass beneath it to swing said closures out of closing relation with their respective holes.

4. A metering device for feeding metal in arc welding apparatus comprising, material supply means, a disc supported for rotation about a substantially vertical axis, said disc having a plurality of holes spaced adjacent the periphery thereof into which material from said supply means is adapted to discharge, a closure for the bottom of each of said holes pivoted to the bottom of said disc, a linkage for each of said closures, said linkages being radially disposed and having one end pivoted to the bottom of said disc and the other end pivoted to their respective closures, an operating member for each of said linkages, each of said operating members passing through said disc and having one end pivoted to its linkage and the other end adapted to extend above the top of said disc, spring means urging each of said other ends of said members above the disc to normally maintain said closures against their respective holes, and a fixedly positioned roller positioned to ride over said other ends of said members to depress the same and to swing said closures to open the bottom of their respective holes.

ROBERT K. HOPKINS.